(12) United States Patent
Eriksson

(10) Patent No.: US 8,159,812 B2
(45) Date of Patent: Apr. 17, 2012

(54) CAPACITOR ELEMENT METHOD FOR MANUFACTURING A CAPACITOR ELEMENT AND USE OF A POWER CAPACITOR

(75) Inventor: Esbjörn Eriksson, Rönninge (SE)

(73) Assignee: ABB Technologies Ltd., Zürich (CH)

( * ) Notice: Subject to any disclaimer, the term of this patent is extended or adjusted under 35 U.S.C. 154(b) by 677 days.

(21) Appl. No.: 12/084,621

(22) PCT Filed: Nov. 2, 2006

(86) PCT No.: PCT/SE2006/050449
§ 371 (c)(1),
(2), (4) Date: Apr. 10, 2009

(87) PCT Pub. No.: WO2007/053108
PCT Pub. Date: May 10, 2007

(65) Prior Publication Data
US 2009/0219667 A1    Sep. 3, 2009

(30) Foreign Application Priority Data
Nov. 7, 2005   (SE) ........................................ 0502454

(51) Int. Cl.
*H01G 4/08* (2006.01)

(52) U.S. Cl. ........................ 361/323; 361/328; 29/25.42

(58) Field of Classification Search .................. 361/273, 361/301.5, 323, 327–329; 29/25.42
See application file for complete search history.

(56) References Cited

U.S. PATENT DOCUMENTS

| | | | |
|---|---|---|---|
| 6,329,892 B1 | 12/2001 | Wohlfarth et al. | |
| 6,493,206 B1 * | 12/2002 | King ........................... | 361/301.5 |
| 6,594,137 B2 | 7/2003 | Eriksson | |
| 6,757,151 B2 | 6/2004 | Eriksson et al. | |
| 6,807,046 B2 | 10/2004 | Reiner et al. | |
| 6,894,886 B2 | 5/2005 | Eriksson et al. | |
| 2003/0142457 A1 * | 7/2003 | Eriksson et al. ........... | 361/301.5 |

FOREIGN PATENT DOCUMENTS

| | | |
|---|---|---|
| DE | 4125197 A1 | 2/1993 |
| WO | WO-0157892 A1 | 8/2001 |

OTHER PUBLICATIONS

PCT/ISA/210—International Search Report—Jan. 24, 2007.
PCT/ISA/237—Written Opinion of the International Searching Authority—Jan. 24, 2007.

* cited by examiner

*Primary Examiner* — Eric Thomas
(74) *Attorney, Agent, or Firm* — Venable LLP; Eric J. Franklin

(57) ABSTRACT

A capacitor element for a power capacitor. The capacitor element includes a plurality of series-connected cylindrical sub-elements. Each sub-element includes at least two strips of dielectric material wound in a number of turns. A layer of electrically conductive material is disposed between the turns of the winding. The sub-elements are disposed one outside the other as seen in a direction transversely to the plane of the strip. A strip in an outermost sub-element is longer than the strip in each inwardly lying sub-element. A power capacitor includes a plurality of the capacitor elements, and a capacitor battery includes a plurality of the power capacitors. A method of manufacturing the inventive capacitor element and the use of the inventive power capacitor.

11 Claims, 3 Drawing Sheets

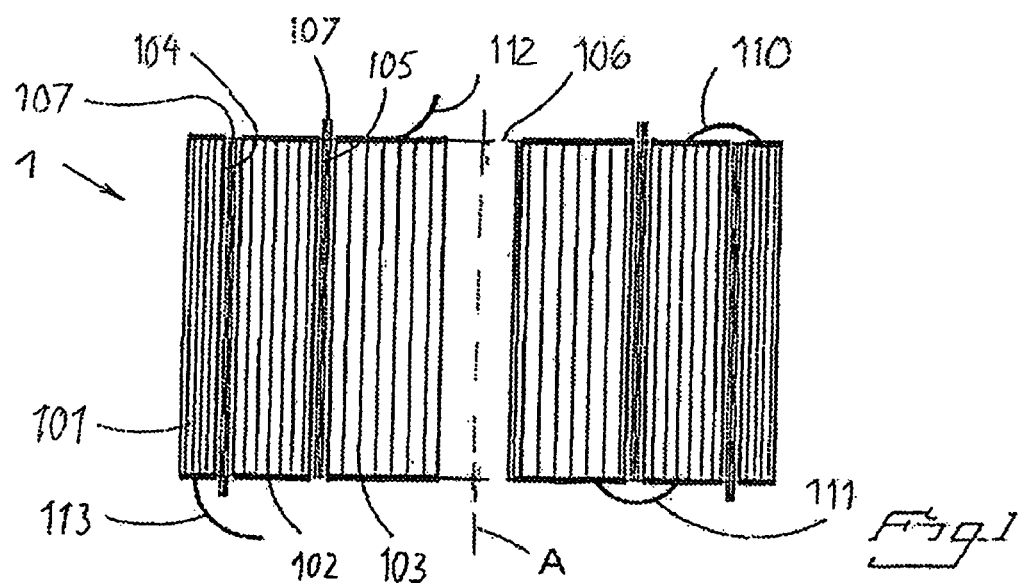
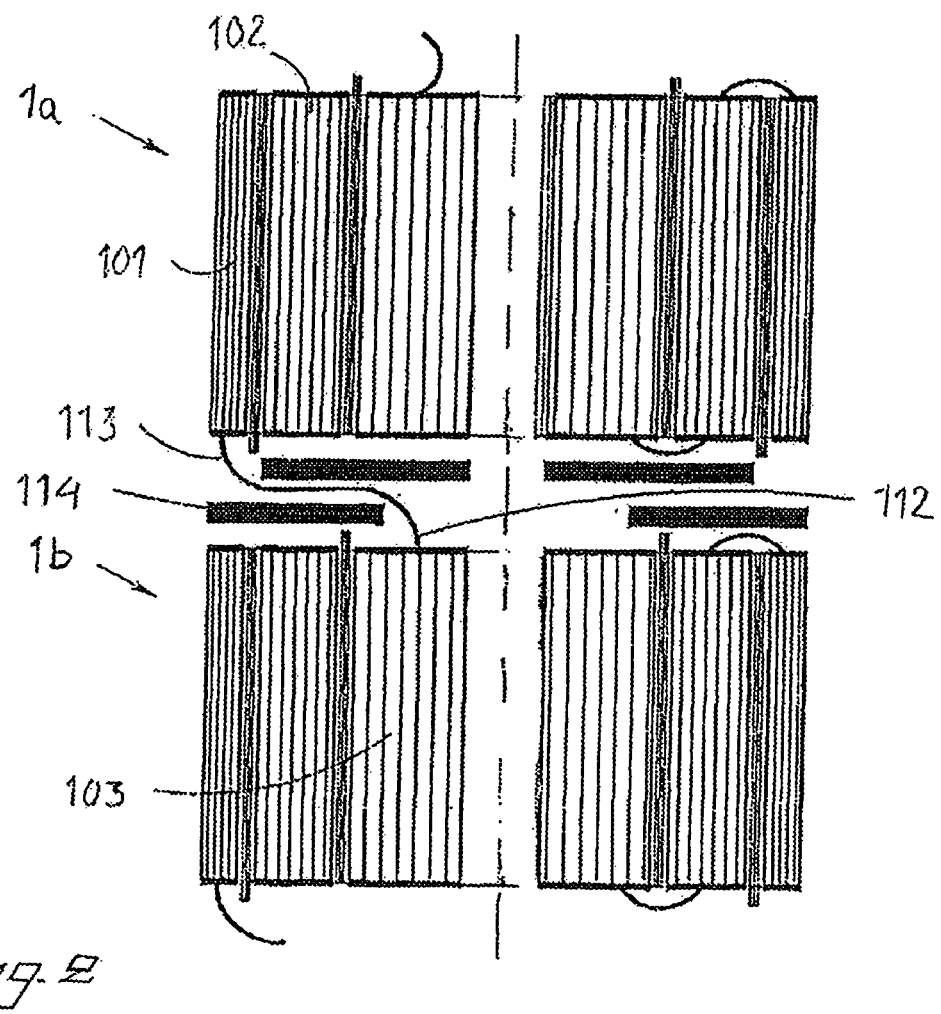

CAPACITOR ELEMENT METHOD FOR MANUFACTURING A CAPACITOR ELEMENT AND USE OF A POWER CAPACITOR

CROSS-REFERENCE TO RELATED APPLICATIONS

This application claims priority to Swedish patent application 0502454-2 filed 7 Nov. 2005 and is the national phase under 35 U.S.C. §371 filed 2 Nov. 2006.

FIELD OF THE INVENTION

According to a first aspect the present invention relates to a capacitor element or an AC-high voltage power capacitor wherein the capacitor element includes a plurality of series-connected cylindrical sub-elements where each sub-element is formed by at least two strips of a dielectric material wound in a plurality of turns, wherein a layer of electrically conductive material is disposed between the turns of the winding, and wherein the sub-elements are disposed one outside the other as seen in a direction transversely to the plane of the strips.

According to a second and a third aspect of the invention the invention relates respectively to a power capacitor for AC-high voltage and to a capacitor battery.

According to a fourth aspect the present invention relates to a method of producing for a power capacitor a capacitor element that comprises a plurality of series-connected cylindrical sub-elements of which each sub-element is formed by winding at least two strips of a dielectric material around a number of turns, wherein one layer of electrically conductive material is disposed between the said turns, and wherein the sub-elements are disposed one outside the other as seen in a direction transversely to the plane of the strip.

According to a fifth aspect the present invention relates to the use of the inventive capacitor.

BACKGROUND OF THE INVENTION

It is known to use in power capacitors a capacitor element which is comprised of hoops that are tightly wound from a strip of thin film dielectric material that has a metal layer applied to one or both sides. The capacitor element may have a circular-cylindrical shape.

It is also known to divide such a capacitor element into several sub-elements and to couple these elements in series. The sub-elements are disposed concentrically around each other, one externally of the other. The sub-elements are normally in an odd number. The sub-elements are wound so that they will all have the same capacitance. Capacitor elements of this described kind are described more specifically in, e.g., WO01/52284, WO 01/52285, WO 01/52286 and WO 01/54151. The capacitor element is wound extremely tightly so as to avoid air gaps between the turns of the winding. This tight winding of the turns means that binding turns that have already been applied will be compressed still further as winding continues. The outmost turn of the winding is not subjected to the force that is exerted inwardly from a plurality of outwardly lying turns. The capacitor element will therefore include very tightly wound film and a number of outermost turns in which although the film is tightly wound it does not fully have the same degree of tightness as the inwardly lying films.

When the capacitor element includes sub-elements, the outer portion of the outermost sub-element will thus be wound more loosely than the inner portion of this outermost sub-element and more loosely than the inwardly lying sub-elements. The winding pressure applied in respect of these latter sub-elements is relatively constant in practice.

It has been found that these less tightly wound outermost turns have poorer electrical properties than the remainder of the capacitor element. These outer turns of the winding will therefore set a limit on the possible dielectric strain. This has a negative influence on the economic use of the capacitor element, since the material consumption is inversely proportional to the square of the dielectric strain.

The object of the present invention is to provide a capacitor element of the kind in question in which the above problem is overcome.

SUMMARY OF THE INVENTION

According to a first aspect of the invention this object has been achieved by providing a capacitor element of the kind concerned with the special feature of using in forming the outermost sub-element strip which is longer than each strip in each inwardly lying sub-element.

As a result of winding the outermost sub-element with a longer winding length, the capacitance of this sub-element will be correspondingly greater than the capacitances of the remaining sub-elements. Because the impedance is inversely proportional to the capacitance, the impedance will decrease to a corresponding degree. The dielectric stress will therewith be lower on the outer sub-element. This enables the capacitor element to be totally optimized so that both the outer sub-element and the inwardly lying sub-elements will have essentially the same margin to what they are able to withstand in respect of load. The total capacitance of the capacitor element will be somewhat higher, as will also its volume/material content. This affords the significant advantage of enabling the capacitor element to be loaded with a higher voltage and therewith generate greater capacitive power.

According to one preferred embodiment of the inventive capacitor element, the strip in the outermost disposed sub-element will have a length in the range of 110 to 120% of the length of the strip in the nearest inwardly lying sub-element.

According to another preferred embodiment of the invention, the layer of electrically conductive material is applied in the form of a coating on at least one side of the strip.

This technical solution is known to the art with respect to the type of capacitor element concerned, and has beneficial properties with regard to the safe-healing ability of the capacitor element. It is also a cost-effective construction with regard to its manufacture. The benefits afforded by this type of capacitor winding are particularly valuable when applying the present invention.

According to another preferred embodiment of the invention, each sub-element comprises two different strips in a number of wound strips, wherewith each alternate winding turn is formed by one strip and each other alternate turn of the winding is formed by the other strip.

An embodiment in which the two strips are coated with an electrically conductive material enables the coating pattern to differ between the strips used, which is one way of achieving so-called interior series coupling in the capacitor element. Internal series coupling is known to the art. The use of such a procedure in conjunction with the basic concept of the present invention has the benefits of enabling interior series coupling to be utilized to a particularly high extent.

A power capacitor that includes a capacitor element in accordance with the present invention and a capacitor battery that includes such a power capacitor provide benefits of a kind corresponding to those given above with respect to the inventive capacitor element.

According to a fourth aspect of the present invention the object of the invention is also achieved with the aid of a method of the kind concerned in the manufacture of a capacitor element, by virtue of the method comprising the particular measures in which the outermost sub-element is wound with strip that is longer than the strips with which each inwardly located sub-element is wound.

The inventive method provides benefits of a kind corresponding to those given above with respect to the inventive capacitor element.

According to a fifth aspect of the present invention the benefits afforded by the inventive power capacitor are utilized in an electric system.

There are many applications in which the inventive power capacitor can be used in an electric system, such as, e.g., for generating reactive power in an electric consumer plant,
for transferring active or reactive power to a DC or an AC network,
as a coupling capacitor for the transmission of high-frequency signals via electric power lines,
as a capacitor voltage divider in a capacitor voltage transformer,
as a component in a voltage stiff or current stiff static converter,
as a component in a AC-filter, and
as a component in a series-compensated capacitor plant, although not, of course limited to these applications.

The invention will now be described in more detail with reference to preferred embodiments thereof and also with reference to the figures of the accompanying drawings.

BRIEF DESCRIPTIONS OF THE DRAWINGS

FIG. 1 is a longitudinal sectional view of a capacitor element according to the present invention.

FIG. 2 illustrates two mutually connected capacitor elements according to FIG. 1.

Figure 3:
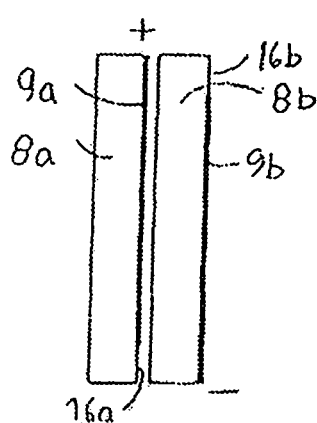
FIG. 3 is an enlarged radial sectional view of part of the FIG. 1 illustration.

FIG. 1 illustrates a circular-cylindrical capacitor element according to the present invention. The capacitor element is divided into three sub-elements 101, 102, 103 which are concentrical with the common axis referenced A. The outermost sub-element 101 is essentially tubular having an inner surface 104 which surrounds the central sub-element 102 in slightly spaced relationship therewith. Similarly, the central sub-element has an inner surface 105 which closely surrounds the innermost sub-element 103. This innermost sub-element 103 includes a central through-passing channel 106.

Each sub-element 101, 102, 103 comprises tightly wound strips of metal-coated polymer foil. The lengths of these strips are generally the same with regard to the two innermost sub-elements 102, 103, whereas the strip used to wind the outermost sub-element 101 is about 15% longer than the other strips. Insulation 107 is provided between the sub-elements.

In an alternative embodiment of the capacitor element shown in FIG. 1, the winding of each sub-element is comprised of two strips of mutually different design.

The sub-elements are coupled in series. Two radially adjacent sub-elements each have a respective coupling point at mutually the same end. Thus, the outermost sub-element 101 is connected to the central sub-element 102 by means of the coupling device 110 at one end of the capacitor element 1, and a central sub-element 103 is connected at the other end of the capacitor element 1. In this way, there are obtained capacitor element connections 112, 113 at respective ends of said element.

If the number of sub-elements is greater than 3, for instance 5 or 7, the coupling points at the ends of the sub-elements are connected alternately, in the same way as that described above.

FIG. 2 shows the way in which a plurality of capacitor elements of the kind illustrated in FIG. 1 are mutually connected in series. The figure shows two such capacitor elements 1a, 1b. The connection 112 of the lower capacitor element 1b at the upper end of the inner sub-element 103 is coupled to the connection 113 of the upper capacitor element 1a at the lower end of the outer sub-element 101. Insulation material 114 is disposed between the capacitor elements in order to cope with the potential differences that occur with this type of capacitor element.

FIG. 3 shows an enlarged radial part-section through one of the sub-elements in FIG. 1 according to said alternative embodiment. This part section shows two adjacent turns of the metal coated film. The respective films 8a and 8b have a thickness of about 10 μm and the material is polypropylene. The metal layer 9a, 9b has a thickness of about nm and is comprised of aluminium or zinc or a mixture thereof, which has been vapour-deposited on the polypropylene film prior to rolling up the strips. With such a metalized film it is possible to reach an electric stress E in the order of magnitude of 80 V/μm at AC. The technique of producing a capacitor element in this way is known to the art, making a more detailed description of the technique superfluous. The use of metalized film has the benefit of being self-healing and permits higher electric stress and higher energy density than in the case of film foil technique.

The metal layer covers the plastic film from one side edge up to a short distance from its other side edge. Thus, an edge region or border region 16a of the film 8a is devoid of a metal coating. Correspondingly, a border region 16b of the film 8b is also devoid of a metal coating. The free border region 16b of the film 8b, however, is at the opposite end edge to the free border region on the film 8a. Electrical connection of layer 9a is obtained at the upper end of the element, as seen in the figure, and at the lower end of layer 9b, so as to obtain a positive electrode in one direction and a negative electrode in the opposite direction. The end-portions may be sprayed with zinc in order to provide an effective electrical contact.

Figure 4:
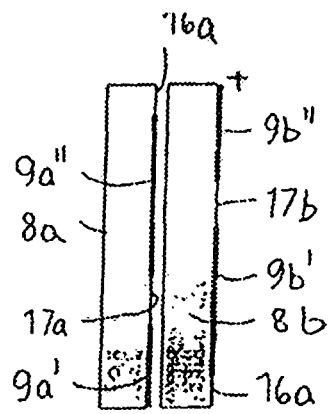
FIG. 4 is a sectional view corresponding to FIG. 3, but illustrating an alternative embodiment.

In the case of the modified embodiment according to FIG. 4, the capacitor element includes a so-called internal series coupling. In this case, the metal layer 9a, 9b on each plastic film 8a, 8b is divided respectively into two parts 9a', 9a' and 9b' and 9b'', which are separated by a non-coated part 17a and 17b respectively. It is also possible to divide the metal layers into more than two parts. Each pair of metal layer parts, e.g. 9a' and 9b', form capacitor sub-elements that are series connected.

Figure 5:
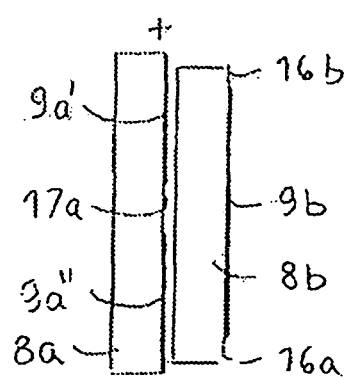
FIG. 5 is a sectional view corresponding to FIG. 3, but illustrating a further alternative embodiment.

FIG. 5 shows a variant of the modified embodiment in which the metal layer 9a on solely the one plastic film 8a is divided into two parts 9a', 9a'' separated by a non-coated part 17a, while the metal layer 9b on the other plastic film 8b is undivided. Each of the parts 9a' and 9a'' extend fully to the edge of the film 8a so that, in this case, the electric connection occurs on one and the same film 8a. The metal layer 9b on the upper plastic film terminates on both sides short of the edge of the film, as indicated at 16a, 16b, and is thus not connected electrically in any direction.

Figure 6:
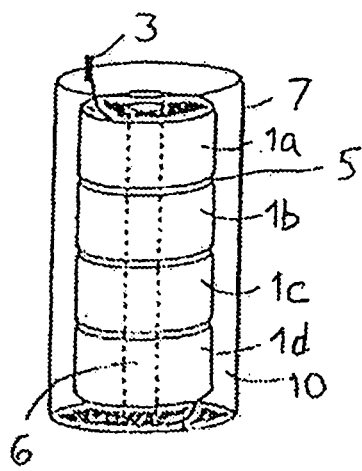
FIG. 6 is a perspective view of a first embodiment of an inventive capacitor.

FIG. 6 illustrates an example of the design of a power capacitor 2 constructed of capacitor elements according to the present invention. This power capacitor is comprised of an outer polyethylene container 7 which encases 4 capacitor elements 1a-1d in the illustrated case. The container 7 and also the capacitor elements 1a-1d are circular-cylindrical in shape. The capacitor elements 1a-1d are series connected. A connection terminal 3, 4 is provided at each end of the capacitor. Each terminal consists of a conductive tab which is fastened in the container material and which extends there through. Each capacitor element 1 may be provided with an axially through-penetrated hole 6 for cooling purposes.

Figure 7:
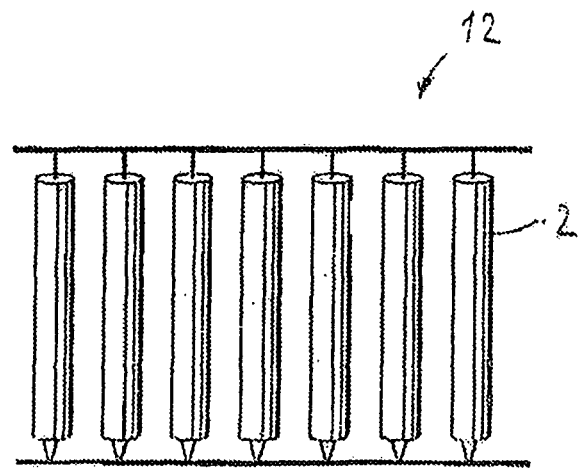
FIG. 7 is a side view of a capacitor battery according to the invention.

FIG. 7 shows how a plurality of power capacitors with cylindrical container 2 are mutually connected to form a capacitor battery 12.

Figure 8:
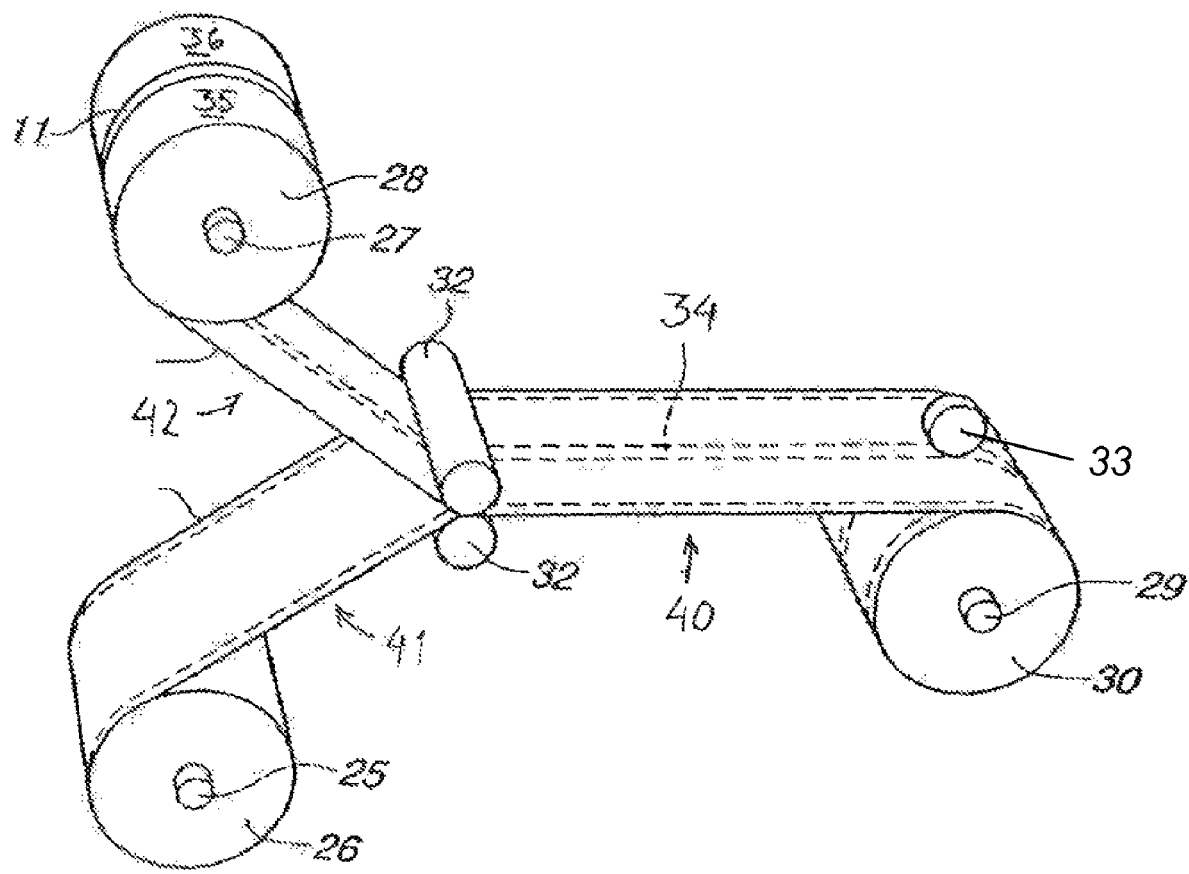
FIG. 8 illustrates schematically a manufacturing step according to the invention.

One method of producing a capacitor element in accordance with the invention will now be described with reference to FIG. 8, which illustrates schematically appropriate production equipment.

In the illustrated case, each sub-element of the capacitor element is comprised of two different metal-coated strips 41, 42 of polymer film. In the illustrated example, the capacitor element is of a kind in which the film of one strip 41 is coated with a metal layer across the whole of one surface with the exception of its edges, whereas the metallic layer of the other strip is divided into two parallel layers 35, 36 with an uncoated region 34 in the centre. The production equipment includes a first rotatable storage axle 29 on which the strip 40 is rolled to form a capacitor element 30, a guide roller 33, and two mutually adjacent guide rollers 32. In producing the capacitor element 30, a roll of strip 41 is placed on the axle 25 and a roll of strip 42 is placed on the axle 27. The strips 41, 42 move up to the guide rollers 32, where they are combined to form the composite strip 40. The composite strip 40 is wound onto the storage axle 29 such that the first strip 41 will form an inner turn and the second strip 42 will form and outer turn, in other words so that the coated surface of the first film will face towards the storage axle 29 and the non-coated surface of the second film will face towards the barrel surface of the capacitor element 30.

Each sub-element in the capacitor element is wound in this way. Strip used in respect of the outermost sub-element is about 15% longer than the strip used in remaining sub-elements. The use of the inventive capacitor in different electric systems is carried out in a way corresponding as that used with typical capacitors. A more specific description of such applications is therefore believed to be superfluous. In this regard, reference is made by way of example to WO01/54152, in which different applications of a power capacitor are described and illustrated.

The invention claimed is:

1. A capacitor element for a power capacitor for AC-high voltage, comprising:
   a plurality of series-connected cylindrical sub-elements, where each sub-element includes at least two strips of dielectric material wound in a number of turns to provide a winding, and wherein a layer of electrically conductive material is disposed between the turns of said winding, wherein the sub-elements are disposed one outside the other as seen in a direction transversely to a plane of the strips, wherein a strip in an outermost sub-element is longer than each strip in each inwardly lying sub-element.

2. The capacitor element according to claim 1, wherein each strip in the outermost sub-element has a length in a range of 110% to 120% of a length of each strip in a nearest inwardly lying sub-element.

3. The capacitor element according to claim 1, wherein the layer of electrically conductive material comprises a coating on at least one side of each strip.

4. The capacitor element according to claim 3, wherein each sub-element includes two mutually different strips wound in a number of turns, wherein each alternative winding turn is formed with a first of the strips and each other alternate winding turn is formed with a second of the strips.

5. A power capacitor for AC-high voltage, comprising:
   a plurality of capacitor elements each comprising a plurality of series-connected cylindrical sub-elements, each sub-element comprising at least two strips of dielectric material wound in a number of turns to provide a winding, a layer of electrically conductive material is disposed between the turns of the winding, wherein the sub-elements are arranged one outside the other as seen in a direction transversely to a plane of the strips, wherein a strip in an outermost sub-element is longer than each strip in each inwardly lying sub-element, said capacitor elements being arranged in juxtaposed relationship along a common axis extending in the longitudinal direction of the cylindrical sub-elements.

6. A capacitor battery, comprising:
   at least one power capacitor comprising a plurality of series-connected cylindrical sub-elements, each sub-element comprising at least two strips of dielectric material wound in a number of turns to provide a winding, a layer of electrically conductive material is disposed between the turns of the winding, wherein the sub-elements are arranged one outside the other as seen in a direction transversely to a plane of the strips, wherein a strip in an outermost sub-element is longer than each strip in each inwardly lying sub-element.

7. A method of manufacturing a capacitor element for a power capacitor, wherein the capacitor element includes a plurality of series-connected cylindrical sub-elements, the method comprising:
   forming each sub-element by winding at least two strips of dielectric material in a plurality of turns to form a winding,
   applying a layer of electrically conductive material between the turns of the winding,
   arranging the sub-elements one outside the other as seen in a direction transversely to the plane of the strip, and
   winding the outermost sub-element with a strip that is longer than a strip with which each inwardly lying sub-element is wound.

8. The method according to claim 7, wherein the outermost sub-element is wound with a strip having a length is in a range of 110 to 120% of a length of strips used to wind a nearest inwardly lying sub-element.

9. The method according to claim 7, wherein the layer of electrically conductive material is applied by coating at least one side of each strip of dielectric material with a coating of electrically conductive material prior to winding said strip.

10. The method according to claim 9, wherein each sub-element is formed by simultaneously winding two different strips of dielectric material.

11. The method according to claim 7, further comprising:
    utilizing the power capacitor as a component in an electrical system.

* * * * *